July 30, 1963
F. M. HUNTER
3,099,578
HEAT RESISTANT ELECTRICALLY CONDUCTING COMPOSITIONS, METHOD
OF COATING ARTICLES THEREWITH AND ARTICLES
PRODUCED THEREBY
Filed Aug. 19, 1960
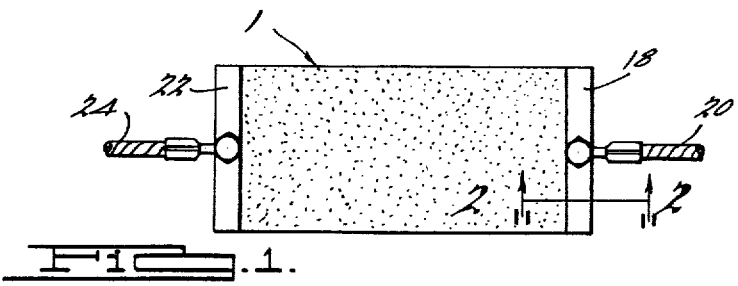
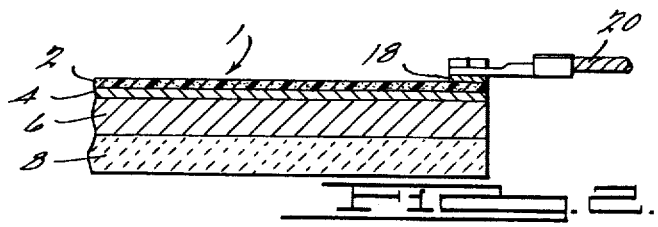
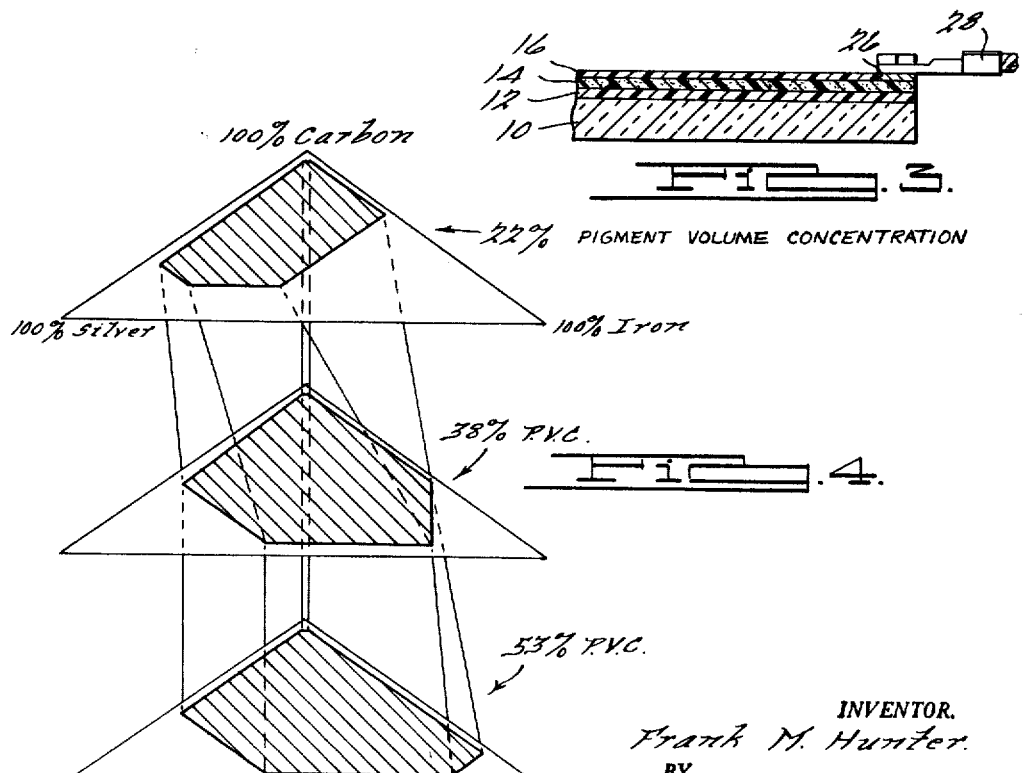
INVENTOR.
Frank M. Hunter.
BY
Harness, Dickey & Pierce
ATTORNEYS.

United States Patent Office 3,099,578
Patented July 30, 1963

---

3,099,578
HEAT RESISTANT ELECTRICALLY CONDUCTING COMPOSITIONS, METHOD OF COATING ARTICLES THEREWITH AND ARTICLES PRODUCED THEREBY
Frank M. Hunter, Port Huron, Mich., assignor to Acheson Industries, Inc.
Filed Aug. 19, 1960, Ser. No. 50,637
9 Claims. (Cl. 117—226)

This invention relates to coating compositions for forming electrically conductive, heat-producing coatings when applied to a non-conducting surface, the method of forming such coatings and the articles produced thereby.

Electrically conductive coatings which function to produce heat as electrical current passes through them are now well known in the art. Such coatings ordinarily comprise a conductive material distributed throughout a non-conductive binder which attaches the coating to a supporting base. The conductive material usually is carbon in one form or another and most often is graphite. The electrical conductance is varied by controlling the proportion of carbon in the coating, but it has also been suggested to combine carbon with a metal to accomplish this purpose. It has been taught that metal used in combination with carbon should be in the form of flakes and these flakes should be oriented in the coating so as to overlap and form an electrical path through the coating. Metal has also been proposed for use in combination with carbon to overcome the negative coefficient of resistance of carbon and to provide a coating with a positive coefficient of resistance. One of the important requirements of electrically resistive coatings is that they maintain a steady and uniform electrical conductance as the temperature changes during use. One of the disadvantages which results from using a coating containing carbon and a flaky metal such as silver flakes is that temperature changes in the coating tend to disrupt the orientation of the flakes in the coating, and this is thought to be due to the wide differences in the rates of thermal expansion of the carbon, the flakes of metal and the binder. In such coatings, the stresses developed during repeated heating and cooling of the film ultimately results in cleavage or separation between the flaky particles and the resin binder with consequent alteration in the electrical conductance and heat-producing ability of the coating.

It is the primary object of this invention to provide a composition which can be applied to a surface to form an electrically conductive heat-producing coating having improved thermal, electrical and mechanical stability during prolonged periods of use.

A further object of this invention is to provide a family of compositions useful for forming electrically conductive, heat-producing coatings on a base, which coatings have preselected electrical resistance and heat-producing ability.

Another object of this invention is to provide a method for making the improved electrically conductive, heat-producing coatings of this invention.

A still further object is to provide improved heating panels, particularly suitable for home heating and the like, which are capable of uniform continuous operation for long periods of time at temperatures up to about 500° F.

In accordance with this invention, it has been found that the above stated disadvantages of the prior suggestions are overcome, and the above and related objectives fully realized by the formulation and use of a composition comprising a heat-stable binder and a mixture of finely divided carbon and granular silver and granular iron particles, which mixture is sometimes hereinafter referred to as conductive pigments.

It has been found that the use of granules is superior to the use of metal in flake form, and produces coatings having improved uniformity in electrical conductance and heat-generating characteristics over long periods of use. This improvement is believed to be due to the smaller internal stresses which develop within the coating which contains fine granular particles relative to coatings which contain the larger flaky metal particles.

In addition to the necessity that the metallic particles be in granular fine particle form, it has been found that there is a definite relationship between the proportions of binder and each of the three particulate materials or pigment which must be observed in order to form the thermally, electrically and mechanically stable coatings of this invention. When these proportions are observed a family of compositions result which when applied to supporting surfaces produce coatings thereon offering a wide range of electrical conductance, and heat-producing ability. The coatings are adherent, strong and yet flexible and do not spall, blister or peel from the surface even though subjected to repeated, rapid changes in temperature.

In the drawing:

FIG. 1 is a plan view showing the electrically conductive coating of this invention on a base with electrodes and electrical connections thereto;

FIG. 2 is a cross sectional view of the element of FIG. 1, taken along the line 2—2 thereof;

FIG. 3 illustrates a modified form of an element made in accordance with this invention; and FIG. 4 is a pictorial representation of the relationship of the proportions of the components of the compositions of this invention.

FIGS. 1 and 2 illustrate a heat producing element or panel, generally designated 1, having a heat-producing coating 2 adhered to an electrically non-conducting layer 4 which directly covers the surface of the base member 6, which as shown is steel. The non-conducting layer 4 may be any non-conducting material so long as it is capable of electrically separating the coating 2 and base 6 and does not deteriorate, in any way, at the intended operating temperature of the element or panel. Vitreous enamel is particularly suitable as a non-conducting layer, but certain heat stable resins such as silicones are also suitable. The base member 6, may have a supporting or heat insulating layer 8 attached thereto, as illustrated in FIG. 2, such as asbestos or heat reflecting material or the like, but layer 8 is not necessary for proper functioning of the element and may be omitted, where desired.

In FIG. 3 there is shown a modified form of the panel illustrated in FIGS. 1 and 2 having a base member 10 of glass, a non-conducting resin layer 12 on the surface of the glass, the conductive coating 14 of this invention, overlying and adhered to the resin layer 12, and a top protective non-conducting resin layer 16 overlying the coating 14. The resin of layers 12 and 16 may be the same or different resins so long as they possess the necessary heat resistance characteristics stated above. Although only one surface of the base 10 is shown as coated, it will be apparent that a similar series of layers 12, 14, 16 may be applied to the other surface of base 10 if desired. The base member may be of materials other than glass or steel since the base member merely serves to support the coating, in all cases is electrically insulated from the coating and may be, for example, plaster, asbestos, reinforced plastics such as glass fiber or metal fiber reinforced plastic, other commercial metals such as zinc, brass, copper, etc. The coating 2 functions as a heating element when electrical energy passes from bus 18, attached to a current source 20, through the coating 2 toward bus 22 which is in electrical contact with the coating at the opposite side of panel 1 and directly connected to electrical connector 24 which completes the circuit. In the modified form shown in FIG. 3, bus 26, attached to current source 28, is located beneath the surface of layer 16 and is in electrical contact with conductive coating 14, and functions in an identical manner. It is to be understood that conventional methods of controlling the current flow through the coatings may be employed and for certain coatings may be desirable, or necessary, to obtain the desired heat output. Such methods include, for example, time controls on the current supply or heat sensitive controls arranged to stop or diminish the current supply at predetermined panel temperatures, etc.

The binder for the conducting particles serves to maintain the particles in fixed relationship to each other in the electrically resistive coating and to adhere the coating to the base. The binder must be one which resists deterioration from oxidation, moisture or the like at room and operating temperature, and must maintain good adherence to the non-conducting base and to the particles as thermal expansion forces are exerted during normal and rapid changes in temperature. The binder should not deteriorate nor detrimentally affect the electrical resistance of the coating at temperatures from room up to about 500° F. A number of binders are satisfactory for this purpose, and particularly satisfactory results have been obtained with thermosetting resinous binders. For example, phenol-aldehyde resins, such as phenol-formaldehyde resin preferably modified to contain a small amount of a flexibilizing agent such as tricresyl phosphate is satisfactory. Preferably, the binder is entirely a silicone resin or an admixture of at least about 25% silicone resin and a compatible thermosettable organic resin such as phenol-aldehyde resins and preferably phenol-formaldehyde, urea-formaldehyde resins, acrylic ester polymers, and silicone-alkyd copolymers. In general, as the proportion of resin other than silicone resin which is present is increased, the safe operating temperature decreases from the ordinary operating maximum of about 500° F. The least expensive and yet thermally stable binder for the intended operating conditions can be easily selected by following this relationship as a guide.

The silicone resin, mentioned above, refers to organo-silicon polymers including alkyl-silicones or aryl silicones or alkyl-aryl silicones suitable for the formation of heat setting resins. Specifically included in this category are the ethyl, methyl, propyl, butyl, amyl, phenyl, xylyl and naphthyl silicones alone or co-condensed with one another or in the form of mixtures of the same. Also organo-silicon polymers carrying halogen substituted molecules may be employed. A number of specific silicone resins and examples of phenolic, urea-formaldehyde, acrylic ester and silicone-alkyd copolymer resins are set forth in the specific examples below.

The silver particulate material which is suitable in the compositions of this invention is any finely divided granular powder such as that manufactured by galvanic precipitation or chemical precipitation methods. As an example of a suitable powder of the type produced by a galvanic precipitation process, the powder available under the designation "Slipowder 120" has been found to be satisfactory. This powder includes particles which are predominantly crystalline and irregular in shape and have a maximum particle size of about 100 microns with about 85% of the particles being finer than 44 microns. This powder has a purity of 99.9% minimum and an apparent density of about 20 to about 35 grams per cubic inch. An example of a suitable powder produced by a chemical precipitation process which has been found to be suitable is "Slipowder 131." This powder has a minimum silver content of 99.9%, an apparent density of approximately 15 grams per cubic inch and a particle size range of about 1–10 microns with a majority of the particles being in the size range of from about 1 to about 5 microns. Powders of these types may be used separately or in admixture in all proportions.

The finely divided iron particles which are suitable are substantially free of oxide and have the same general particle size range as the silver granules, that is, the granules should be less than about 100 microns in maximum dimension and preferably smaller. Powders meeting these requirements include sponge iron and carbonyl iron. A carbonyl iron powder which has been found to be suitable is carbonyl iron SF obtained from General Aniline and Flm Corporation. Granules of this material are substantially spherical in shape and have a particle size range of about 1 to about 10 microns. MH–300 sponge iron powder, obtained from Hoeganaes Sponge Iron Corporation, has been used satisfactorily and is the preferred form of iron granule for use in the compositions of this invention. This powder has granules which are irregular in shape, somewhat porous and has a minimum purity of 98%. 99% of the granules of this powder are smaller than 62 microns and 87% of the granules of this powder are smaller than 44 microns.

The carbon pigment may be either carbon black produced by the thermal decomposition of hydrocarbons in preheated furnaces or in the form of finely divided graphites. A particularly useful type of carbon is acetylene black. A preferred form of carbon is finely divided electric furnace graphite having a carbon content of 99+% and a specific surface area of between about 10 and about 150 square meters per gram and preferably between about 80 and 150 square meters per gram.

The compositions may include minor proportions of other ingredients, the presence of which is optional, which confer additionally desirable characteristics on the resulting compositions. For example, anti-oxidants such as butylated hydroxy-toluene are beneficial in preventing oxidation of the finely divided iron particles either during the mixing stage or the storage of the compositions of this invention, but other well-known anti-oxidants may be employed for this purpose. Where the desired coatings are to be of substantial thickness it is desirable to incorporate a small quantity of a leveling agent such as lecithin, or equivalent material. In the presence of certain resinous systems, a dryer is desirable, for example, cobalt octoate. Small quantities of filler, coloring agents or the like may also be included, as long as they are compatible with the other ingredients and the proportions are sufficiently small to avoid detrimental effects on the electrical conductivity characteristics of the coatings.

The binder and conductive pigments are united into the coating forming compositions of this invention by the presence of a solvent for the particular resinous binder which is being used. The particular solvent, or solvent-diluent which is employed is not critically important and the amount of the solvent which is present can be varied widely. It is only necessary to include a sufficient quantity of solvent to maintain the binder and conductive pigments in a uniform blend and to provide the requisite viscosity to accommodate the particular method of application of the composition to the surface to be coated which it is desired to employ. The compositions may be applied by spraying, brushing, roller coating, or by dipping the surface to be coated into a bath of the liquid composition. Ordinarily, after the resinous binder and conductive pigments are mixed, an additional quantity of diluent is added to obtain the required consistency for the selected mode of application. When the resinous binder includes a silicone resin, the preferred solvent contains a high percentage of xylene.

The compositions of this invention are formed by uniformly mixing the carbon particles with the resins, which in their preferred form are solutions in a solvent, and thereafter the metal granules are blended into the resin carbon mixture and additional solvent and/or diluent added thereafter. When dryers, leveling agents, or the like are to be included, they are added simultaneously with the metal granules. Satisfactory mixing is accomplished in a variety of types of mixing apparatus, but care should be taken to avoid such vigorous mixing that the metal granules are reduced to flake form such as occurs to some extent in extended periods of ball milling. A double-armed internal mixer of the Baker-Perkins type is especially suitable for mixing the ingredients of the compositions of this invention.

As above stated, the proportions of the binder and the conductive pigments in the compositions of this invention must fall within certain limits in order to produce electrically conductive coatings having improved electrical, thermal and mechanical characteristics. It has been found that the sum of the three conductive pigments should be present in an amount between about 22% and 53%, by volume, of the coating. As used in this specification hereinafter and in the appended claims, this relationship is referred to as PVC or pigment volume concentration and is the portion of the total coating which is occupied by the combined carbon, silver and iron pigments, expressed as volume percent of the total coating. Unless otherwise specified, the proportion or quantity of the individual pigments, carbon or silver or iron is given hereinafter and in the appended claims as percent by volume of the total pigment. When the PVC drops below about 22%, the resistance of the coating becomes undesirably high regardless of the modification of the relative proportions of the carbon, silver and iron particles. At the other extreme, when the PVC exceeds about 53%, the coating becomes deficient in mechanical properties regardless of the modification of the relative proportions of the carbon, silver and iron particles, that is, in adherence, flexibility and the like.

The limits of each of the conductive pigments and the variations thereof as the PVC changes is given in Table I below. The variation in the quantity present of any one pigment has an effect on the ultimate electrical resistance of the film or its thermal or mechanical properties but to an extent which is at least partially dependent on the relative proportion of the other pigments which are present as well as the percent PVC.

Otherwise stated, the proportion of each of the components is interdependent on the proportion of the other components. The relative proportion of the conductive pigments to variation in the proportions of PVC, defined in Table I, is pictorially represented in FIG. 4, which is a three-dimensional representation of the permissible variation of the three conductive pigments at each of three specific pigment volume concentrations, namely 22%, 38% and 53%. The useful variation of the conductive pigments is shown on a conventional ternary diagram of the three components carbon, silver and iron on each of the planes designated 22% PVC, 38% PVC and 53% PVC, respectively, as the area encompassed within the six sided figure on each plane. The vertical lines connecting corresponding portions of these ternary diagrams at each PVC concentration encompass substantially the volume which defines the proportions of permissible variation of the conductive pigments at pigment volume concentrations intermediate 22% and 53%. It is to be understood that FIG. 4 does not quantitatively represent the irregular shaped prism which constitutes the limits of this invention since the defining limits are given in Table I. FIG. 4 does show, however, the significant effect which PVC has on the permissible relative variation of carbon, silver and iron. For example, it may be seen by inspecting FIG. 4 in conjunction with Table I that as the PVC increases from about 22% toward about 53% the quantity of iron which may be present increases from a maximum of about 35% at 22% PVC to about 80% at 53% PVC. Simultaneously, the proportion of silver decreases from a maximum of about 65% at 22% PVC to a maximum of about 55% at 38% PVC and thereafter remains substantially constant to 53% PVC. Similarly, as the PVC increases from 22% toward 53% the permissible minimum carbon decreases from about 20% at 22% PVC to a minimum of about 5% at 38% PVC and remains substantially constant thereafter to 53% PVC.

TABLE I

The compositions of this invention are made up of the granular ingredients, carbon, iron, and silver in proportions by volume which fall within the area on ternary diagrams enclosed by the perimeter connecting the following reference points.

At a minimum pigment volume concentration of about 22%:

| Carbon, about percent | Silver, about percent | Iron, about percent |
|---|---|---|
| 93 | 5 | 2 |
| 93 | 2 | 5 |
| 63 | 2 | 35 |
| 20 | 45 | 35 |
| 20 | 65 | 15 |
| 30 | 65 | 5 |

At an intermediate pigment volume concentration of about 38%:

| Carbon, about percent | Silver, about percent | Iron, about percent |
|---|---|---|
| 93 | 5 | 2 |
| 93 | 2 | 5 |
| 40 | 2 | 58 |
| 5 | 20 | 75 |
| 5 | 55 | 40 |
| 40 | 55 | 5 |

At a maximum pigment volume concentration of about 53%:

| Carbon, about percent | Silver, about percent | Iron, about percent |
|---|---|---|
| 93 | 5 | 2 |
| 93 | 2 | 5 |
| 18 | 2 | 80 |
| 5 | 15 | 80 |
| 5 | 55 | 40 |
| 40 | 55 | 5 | and by the areas enclosed on ternary diagrams bounded by the perimeter connecting interpolated points at pigment volume concentrations between about 22% and about 53%.

In actual practice it has been found that the size of the particles of carbon, silver and iron affects the electrical resistance of the resultant coating and in general as the particle size of one or more of the conductive pigments decreases from a maximum of about 100 microns downwardly toward a minimum of about 1 micron that the over-all resistance decreases. It is preferred, in any particular composition to employ a mixture of particle sizes to obtain the most uniform distribution of the particles to each other in the coating. Since the electrical resistance of the coating is dependent upon the particle to particle contact within the coating, in employing the limits above defined in Table I to formulate a specific coating composition intended for a particular application it is only necessary to select the binder and binder resin and to formulate a coating composition containing the relative proportions of pigments which fall within the volume encompassed by specific limits set forth in Table I and pictorially represented in FIG. 4 and to check the actual electrical resistance value obtained from that coating. In the event the electrical resistance and the heat producing ability of that coating does not approximate that which is desired for the particular intended application the desired electrical resistance may be easily obtained by modifying the composition to other specific proportions set forth in Table I by observing the following general guiding principles. As the proportion of silver, relative to the carbon and iron, increases, the electrical resistance of the resulting coating decreases and concurrently the heat producing ability of that coating increases. As the proportion of iron increases, relative to the carbon and silver in the coating, the electrical resistance of the resulting coating increases and the heat producing ability of the coating concurrently decreases. As the proportion of carbon decreases, relative to the iron and silver in the coating, the electrical resistance increases with consequent decrease in its heat producing ability. It will be understood that the above relationships assume a constant voltage. It will thus be apparent that Table I defines a family of compositions from which a coating composition having pre-selected characteristics can be easily and readily determined by a mere reference thereto.

The method of this invention comprises the steps of formulating a coating composition and applying it to the surface of the base by one of the above mentioned methods and thereafter curing the coating in place to effect adherence of the coating to the base surface and permanently position the conductive pigments relative to each other in the coating. Satisfactory curing of the coating is attained by subjecting the coating to a raised temperature for a short period of time, the necessary temperature depending upon the particular resin binder being used. Satisfactory curing is ordinarily obtained at a temperature in the range of about 300° F. to 600° F. for ten to fifteen minutes. In order to obtain electrical and thermal stability of the most improved type which characterizes the better coatings of this invention, the coating is then subjected to an additional raised temperature heating step for an extended period of time, such as 300° F. to 600° F. for two to four hours. In any case, the particular coating should be subjected to an electrical stabilizing step of this latter type which is above the temperature of expected use of the coating. Thus, a coating intended for 500° F. temperature operation should be electrically stabilized between 550° F. and 650° F., etc. When this treatment is effected it has been found that the coatings thereafter maintain their electrical conductiveness and heat producing properties throughout an extended or prolonged period of use without substantial change.

The compositions of this invention can be applied to any electrically non-conducting surface on which the coating can be properly cured, and which is thermally suitable, such as glass, plaster, asbestos, glass-reinforced plastics, ceramic enamelled metals, etc. It is essential that the coatings be applied only to electrically non-conductive surfaces. In some cases it is desirable to use a non-pigmented resin, the same or different from the binding resin, as an undercoating between the substrate and the resistive coating. This will insure not only that a smooth substrate exists, but also that a non-conductive surface is present on the base material. It is sometimes desirable to use a non-pigmented resin overcoating on the applied film to act as a protective coating and electrical insulator.

The thickness of the applied coating can vary widely between about 1 mil and about 10 mils. The preferred range for most applications is between 3 mils and 6 mils. The actual thickness which is to be used on the substrate to form a heating element is dependent upon the resistance of the coating, the geometry of the panel, and the desired electrical and thermal properties which the heating element is to have.

The following examples are intended to illustrate typically suitable compositions and the effect of variations in the relative proportions of the conductive pigments and the binder, but it is to be understood that the examples do not represent the defining limits of the invention which have been set forth herein above and are included in the appended claims.

*Example I*

A coating composition was prepared containing:

| | Parts by weight |
|---|---|
| Graphite powder (80M²/gram) | 16.52 |
| Silver powder (Silpowder 120) | 7.23 |
| Silver powder (Silpowder 131) | 7.23 |
| Sponge iron powder (MH-300) | 11.02 |
| Silicone resin (SR-83.[1] 60% solids in xylene) | 34.5 |
| Cobalt octoate, 6% cobalt | 0.60 |
| Lecithin | 1.70 |
| Xylene | 20.80 |
| Butylated hydroxytoluene | 0.40 |

[1] Polymerized dimethylsilandiol, General Electric Company.

The composition was prepared by first mixing the graphite and resin solution for 4 hours and thereafter the other ingredients were added to the graphite-resin mixture and mixing was continued for an additional 2 hours. All mixing occurred in a double-arm Baker-Perkins type mixer. After mixing, the mixture was thinned with additional xylene to a spraying consistency, such that the composition contained about 30% solids by weight. The sprayable composition was then sprayed on the surface of a vitreous enamel coated steel panel 8″ x 8″ and the coating was cured by placing the coated panel in an oven maintained at about 400° F. for 2 hours. Thereafter, the temperature was raised to 550° F. and held for an additional 2 hours. The coated surface was smooth and the coating was adherent and resistant to removal by rubbing or the like. Measurement showed the film thickness to average about 4 mils and the coated panel when subjected to the passage of electrical current, at 110 volts, showed the coating to have an electrical resistance of 55 ohms per square.

The above composition had a PVC of 36% and contained 72.4% graphite, 13.6% silver and 14.0% iron, by volume of the total pigment.

*Example II*

A composition was prepared containing:

| | Parts by weight |
|---|---|
| Silicone-alkyd copolymer [1] (ST-856) | 32.72 |
| Graphite powder 80M²/gm | 16.52 |
| Silver powder (Silpowder 120) | 7.23 |
| Silver powder (Silpowder 131) | 7.23 |
| Sponge iron (MH-300) | 11.02 |
| Butylated hydroxytoluene | 0.40 |
| Cobalt octoate | 0.60 |
| Lecithin | 1.70 |
| Xylene | 22.58 |

[1] Silicone-alkyd copolymer, Allied Chemical & Dye Corporation.

The composition was formulated by using the procedures described in Example I and when diluted with xylene to about 30% solids consistency was sprayed on a base member, the upper surface of which was covered with a layer of silicone resin SR-82. The sprayed on coating was cured in an oven for 1 hour at 400° F. and thereafter for 2 additional hours at 500° F. The coating was adherent, relatively smooth, had a thickness of about 3½ mils and, upon testing was found to have an electrical resistance of 17 ohms per square.

The above composition had a PVC of 41% and contained 73.2% graphite, 13.2% silver and 13.6% iron, by volume of the total pigment.

Example III

A composition was prepared containing:

| | Parts by weight |
|---|---|
| Graphite powder 100M²/gm | 5.38 |
| Silver powder (Silpowder 131) | 0.90 |
| Silver powder (Silpowder 120) | 0.90 |
| Carbonyl iron (GAF carbonyl iron SF) | 10.80 |
| Silicone resin (SR-82) | 5.02 |
| Silicone resin (DC 805,[1] 50% solids in xylene) | 18.01 |
| Cobalt octoate, 6% cobalt | 0.58 |
| Lecithin | 0.22 |
| Butylated hydroxytoluene | 0.05 |
| Xylene | 58.14 |

[1] Polymerized organopolysiloxane resin, Dow-Corning Corporation.

The composition was prepared by using the steps set forth in Example I, sprayed on an 8" x 8" vitreous enamel coated steel panel and cured, and electrically stabilized under the conditions specified in Example I. An inspection and testing of the resulting film showed the film to be smooth and adherent, to have an average thickness of about 4 mils and an electrical resistance of 150 ohms per square.

The above composition has a PVC of 25% and contains 61% graphite, 4% silver and 35% iron, by volume of the total pigment.

Example IV

A coating composition was prepared containing:

| | Parts by weight |
|---|---|
| Graphite powder (80M²/gram) | 8.40 |
| Acrylic ester polymer (Acryloid A-10)[1] | 22.00 |
| SR-82 silicone resin | 7.53 |
| Silver powder (Silpowder 131) | 3.50 |
| Silver powder (Silpowder 120) | 3.50 |
| Iron powder (MH-300 sponge iron) | 5.60 |
| Cobalt octoate (6% cobalt) | 0.24 |
| Xylene | 48.73 |

[1] Sold by the Rohm & Haas Company.

The composition was formulated by the technique set forth in Example I and spray coated on the surface of an 8" x 8" vitreous enamel coated steel panel, cured for 1 hour at 400° F. and an additional 2 hours at 550° F. The resulting coating had an average thickness of 3.5 mils and an electrical resistance of 100 ohms per square.

The above composition had a PVC of 37% and contained 73% graphite, 13% silver and 14% iron, by volume of the total pigment.

Example V

A coating composition was prepared containing:

| | Parts by weight |
|---|---|
| Acetylene black (Shawinigan A/B, 50% compressed) | 6.02 |
| Silver powder (Silpowder 131) | 3.60 |
| Silver powder (Silpowder 120) | 3.60 |
| Sponge iron (MH-300) | 4.80 |
| Silicone resin (SR-82) | 23.98 |
| Butylated hydroxytoluene | 0.06 |
| Lecithin | 0.24 |
| Cobalt octoate (6% cobalt) | 0.82 |
| Xylene | 56.88 |

The composition was prepared containing the procedures described in Example I and sprayed on a vitreous enamel steel, 8" x 8" panel, cured for 2 hours at 400° F., and 2 hours at 550° F. The resulting film had an average thickness of 4 mils and an electrical resistance of 100 ohms per square.

The above composition had a PVC of 29% and contained 75.7% acetylene black, 11.6% silver and 12.7% iron, by volume of the total pigment.

Example VI

The following series of formulations illustrate the effect on electrical resistance caused by change in the percent PVC when the relative proportions of carbon, silver and iron are maintained constant.

A composition was prepared containing:

| | Parts by weight |
|---|---|
| Graphite (80M²/gram) | 50.00 |
| Silver (Silpowder 120) | 20.00 |
| Iron (MH-300 sponge) | 30.00 |
| Silicone resin (SR-82) | 164.47 |
| Cobalt octoate | 1.28 |
| Xylene | 891.11 |

This composition has a percent PVC of 25 and contains 79.5% graphite, 6.82% silver and 13.67% iron, by volume. When sprayed on a vitreous enamel 8" x 8" panel and cured by the procedures described in Example I, the coating was found to have an electrical resistance of 70 ohms per square at a thickness of 4 mils.

A second composition was prepared containing:

| | Parts by weight |
|---|---|
| Graphite (80M²/gram) | 16.666 |
| Silver (Silpowder 120) | 6.666 |
| Iron (MH-300 sponge) | 10.000 |
| Silicone resin (SR-82) | 33.922 |
| Cobalt octoate | 0.600 |
| Xylene | 226.180 |

This composition has a percent PVC of 35 and the same relative quantities of graphite, silver and iron set forth in the first formulation above. After spraying and curing, as above, the coating was observed to be slightly rough but to have good adhesion, and at an average thickness of 4 mils the coating had an electrical resistance of 28 ohms per square.

A third composition was prepared containing:

| | Parts by weight |
|---|---|
| Graphite (80M²/gram) | 16.666 |
| Silver (Silpowder 120) | 6.666 |
| Iron (MH-300 sponge) | 10.000 |
| Silicone resin (SR-82) | 18.693 |
| Cobalt octoate | 0.320 |
| Xylene | 174.480 |

This composition had a percent PVC of 45 and contained the same relative quantities of graphite, silver and iron as in the first and second compositions above. When sprayed and cured, as above, the cured coating was observed to be slightly rough but to have good adhesion and to have an electrical resistance of 16 ohms per square at a coating thickness of 4 mils.

Example VII

The following formulations illustrate the effect of variation in silver content when the percent PVC is maintained substantially constant and the amount of iron is maintained substantially constant at a low level.

| | Parts by weight |
|---|---|
| Graphite | 39.45 |
| Silver (Silpowder 131) | 0.42 |
| Iron (MH-300 sponge) | 2.10 |
| Silicone resin (SR-82) | 53.80 |
| Lecithin | 1.78 |
| Cobalt octoate | 1.12 |
| Butylated hydroxy toluene | .38 |
| Xylene | 330.16 |

This composition contained a percent PVC of 38 and contained 98.28% graphite, 0.22% silver and 1.5% iron, by volume. When the coating was sprayed on vitreous enamel coated steel panels in accordance with the procedures detailed in Example I and cured, an inspection of the surface showed the surface to be rough and to contain spaced pinholes. When current was passed through the coating at a thickness of 4 mils, an electrical resistance of 47 ohms per square was determined but the presence of the pinholes resulted in the development of hot spots in the coating and resulted in changes in electrical resistance and ultimate failure.

A second composition was prepared containing:

| | Parts by weight |
|---|---|
| Graphite (80M²/gram) | 9.80 |
| Silver (Silpowder 120) | 7.70 |
| Silver (Silpowder 131) | 7.70 |
| Iron (MH-300 sponge iron) | 2.80 |
| Silicone resin (SR-82) | 23.00 |
| Xylene | 48.21 |
| Butylated hydroxytoluene | .123 |
| Cobalt octoate (6% Co) | .183 |
| Lecithin | .506 |

This formulation had a percent PVC of 34 and contained 70.5% graphite, 23.7% silver and 5.8% iron, by volume.

A sprayed and cured film of the type obtained with the first composition of this example was smooth, hard, adherent and at a 4 mil thickness had an electrical resistance of 20 ohms per square. Upon continued use, the resistance stayed constant and the coating generated an even flow of heat.

A third composition was prepared containing:

| | Parts by weight |
|---|---|
| Graphite (80M²/gram) | 6.56 |
| Silver (Silpowder 120) | 52.50 |
| Iron (MH-300 sponge) | 3.27 |
| Silicone resin (SR-82) | 29.10 |
| Cobalt octoate | 0.25 |
| Xylene | 305.60 |

The composition contained a percent PVC of 36 and 35% graphite, 60% silver and 5% iron. Sprayed coatings on enameled steel panels, cured and electrically stabilized by the procedures of Example 1 were observed to be hard, slightly rough and to have excellent adhesion. At a 4 mil thickness the coating was found to have an electrical resistance of 0.25 ohm per square, to heat very rapidly when supplied with current from 110 volt source and were susceptible to burning out.

Example VIII

The formulations of this example illustrate the effect of increasing the relative proportion of iron when the percent PVC and the ratio of carbon to silver is maintained substantially constant.

A first composition was prepared containing:

| | Parts by weight |
|---|---|
| Graphite (80M²/gram) | 4.123 |
| Silver (Silpowder 131) | 21.000 |
| Silver (Silpowder 131) | 21.000 |
| Iron (MH-300 sponge) | 36.316 |
| Silicone resin (SR-82) | 30.337 |
| Cobalt octoate | 0.030 |
| Xylene | 306.020 |

This composition has a percent PVC of 35 and contained 22% graphite, 24% silver and 54% iron. Coatings formed and cured using the procedures outlined in Example I at 3½ mils thickness were found to have an electrical resistance of 250 ohms per square. The observed coatings were hard, slightly rough but had excellent adhesion and cohesion.

A second composition was prepared containing:

| | Parts by weight |
|---|---|
| Graphite (80M²/gram) | 1.50 |
| Silver (Silpowder 120) | 6.50 |
| Iron (MH-300 sponge) | 54.94 |
| Silicone resin (SR-82) | 29.68 |
| Cobalt octoate | 0.30 |
| Xylene | 309.74 |

This composition had a percent PVC of 38 and contained 8% graphite, 8% silver and 84% iron. When cured coatings on enameled steel panels were tested, they were found to have an electrical resistance of 20,000 ohms per square at 4 mils thickness.

Example IX

This example illustrates the effect of reducing the carbon content while maintaining the percent PVC and the ratio of silver to iron substantially constant.

A first composition was prepared containing:

| | Parts by weight |
|---|---|
| Graphite (80M²/gram) | 4.20 |
| Silver (Silpowder 120) | 13.65 |
| Silver (Silpowder 131) | 13.65 |
| Iron (MH-300 sponge) | 10.50 |
| Silicone resin (SR-82) | 62.84 |
| Cobalt octoate (6% Co) | 0.60 |
| Lecithin | .17 |
| Butylated hydroxytoluene | .04 |
| Xylene | 352.10 |

This composition had a percent PVC of 24 and contained 32.22% graphite, 44.7% silver and 23.1% iron. Glass 8" x 8" panels were spray coated with the above composition, the coating cured and electrically stabilized at the temperatures and for the times set forth in Example 1. An inspection of the coating showed it to be somewhat rough but to have excellent adhesion and hardness. A coating of 4 mils thickness was found to have an electrical resistance of 50 ohms per square.

A second composition was prepared containing:

| | Parts by weight |
|---|---|
| Graphite (80M²/gram) | 2.10 |
| Silver (Silpowder 120) | 13.65 |
| Silver (Silpowder 131) | 13.65 |
| Iron (MH-300 sponge) | 12.60 |
| Silicone resin (SR-82) | 65.56 |
| Cobalt octoate (6% Co) | .63 |
| Lecithin | .10 |
| Butylated hydroxy toluene | .02 |
| Xylene | 361.00 |

This composition had a percent PVC of 22 and contained 18.21% graphite, 50.54% silver and 31.25% iron. 8" x 8" glass panels spray coated with this composition, cured and electrically stabilized as in the first composition above where observed to be hard, have excellent adhesion to the glass surface and to be somewhat rough but free of pinholes. At a 4 mil thickness the coating was found to have a resistance of 15,000 ohms per square.

Example X

A composition was prepared containing:

| | Parts by weight |
|---|---|
| Graphite (80M²/gram) | 10.49 |
| Silver (Silpowder 131) | 28.00 |
| Sponge iron (MH-300) | 7.85 |
| Silicone resin (SR-82) | 13.61 |
| Xylene | 116.00 |

This composition had a percent PVC of 55 and contained 53% carbon, 32% silver and 12% iron. When sprayed on vitreous enamel coated steel panels and cured at 550°, the coating was observed to be soft and powdery and lacked sufficient adhesion to maintain the coating intact when rubbed under only slight pressure.

Example XI

A coating composition was prepared containing:

| | Parts by weight |
|---|---|
| Graphite (80M²/gram) | 11.7 |
| BKS–2600 ¹ phenolic resin (60% soln.) | 21.5 |
| Butylated hydroxy toluene | 0.3 |
| Silpowder 120 | 5.10 |
| Silpowder 131 | 5.10 |
| MH–300 sponge iron | 7.80 |
| Ethanol | 46.5 |
| Tricresyl phosphate | 2.0 |

¹ Phenol formaldehyde resin, Union Carbide.

After spraying an enamel coated steel panel with the above composition and baked for 2 hours at 300° F., the coating was observed to be uniform and smooth but somewhat brittle. At a thickness of 4 mils the electrical resistance was found to be 400 ohms per square.

What is claimed is:

1. A composition for forming an electrically conductive coating on a non-conducting surface comprising an admixture comprising a binder, finely divided carbon, and silver and iron in finely divided granular particle form, said binder and said granules being present in proportions within the limits defined by the following reference points in volume percent of total pigment:

at a pigment volume concentration of about 22%—
 about 93% carbon, about 5% silver, about 2% iron
 about 93% carbon, about 2% silver, about 5% iron
 about 63% carbon, about 2% silver, about 35% iron
 about 20% carbon, about 45% silver, about 35% iron
 about 20% carbon, about 65% silver, about 15% iron
 about 30% carbon, about 65% silver, about 5% iron
at a pigment volume concentration of about 38%—
 about 93% carbon, about 5% silver, about 2% iron
 about 93% carbon, about 2% silver, about 5% iron
 about 40% carbon, about 2% silver, about 58% iron
 about 5% carbon, about 20% silver, about 75% iron
 about 5% carbon, about 55% silver, about 40% iron
 about 40% carbon, about 55% silver, about 5% iron
at a pigment volume concentration of about 53%—
 about 93% carbon, about 5% silver, about 2% iron
 about 93% carbon, about 2% silver, about 5% iron
 about 18% carbon, about 2% silver, about 80% iron
 about 5% carbon, about 15% silver, about 80% iron
 about 5% carbon, about 55% silver, about 40% iron
 about 40% carbon, about 55% silver, about 5% iron
and by the limits defined by interpolated points at pigment volume concentrations intermediate about 22% and about 53%.

2. A composition for forming an electrically conductive coating on a non-conductive surface comprising a thermosettable binder and a solvent for said binder having uniformly distributed therein finely divided particles of carbon, and granular particles of silver and iron, said granules having a maximum dimension of about 100 microns, said binder and said granules being present in proportions within the limits defined by the following reference points in volume percent of total pigment:

at a pigment volume concentration of about 22%—
 about 93% carbon, about 5% silver, about 2% iron
 about 93% carbon, about 2% silver, about 5% iron
 about 63% carbon, about 2% silver, about 35% iron
 about 20% carbon, about 45% silver, about 35% iron
 about 20% carbon, about 65% silver, about 15% iron
 about 30% carbon, about 65% silver, about 5% iron
at a pigment volume concentration of about 38%—
 about 93% carbon, about 5% silver, about 2% iron
 about 93% carbon, about 2% silver, about 5% iron
 about 40% carbon, about 2% silver, about 58% iron
 about 5% carbon, about 20% silver, about 75% iron
 about 5% carbon, about 55% silver, about 40% iron
 about 40 carbon, about 55% silver, about 5% iron
at a pigment volume concentration of about 53%—
 about 93% carbon, about 5% silver, about 2% iron
 about 93% carbon, about 2% silver, about 5% iron
 about 18% carbon, about 2% silver, about 80% iron
 about 5% carbon, about 15% silver, about 80% iron
 about 5% carbon, about 55% silver, about 40% iron
 about 40% carbon, about 55% silver, about 5% iron
and by the limits defined by interpolated points at pigment volume concentrations intermediate about 22% and about 53%.

3. A composition in accordance with claim 2, wherein said binder contains at least about 25% by weight of a silicone resin.

4. A method for forming an electrically conductive coating on a non-conducting surface which comprises the steps of applying to said surface a composition comprising a binder, finely divided carbon and silver and iron in finely divided granular particle form, said binder and said granules being present in proportions within the limits defined by the following reference points in volume percent of total pigment:

at a pigment value concentration of about 22%—
 about 93% carbon, about 5% silver, about 2% iron
 about 93% carbon, about 2% silver, about 5% iron
 about 63% carbon, about 2% silver, about 35% iron
 about 20% ctrbon, about 45% silver, about 35% iron
 about 20% carbon, about 65% silver, about 15% iron
 about 30% carbon, about 65% silver, about 5% iron
at a pigment volume concentration of about 38%—
 about 93% carbon, about 5% silver, about 2% iron
 about 93% carbon, about 2% silver, about 5% iron
 about 40% carbon, about 2% silver, about 58% iron
 about 5% carbon, about 20% silver, about 75% iron
 about 5% carbon, about 55% silver, about 40% iron
 about 40% carbon, about 55% silver, about 5% iron
at a pigment volume concentration of about 53%—
 about 93% carbon, about 5% silver, about 2% iron
 about 93% carbon, about 2% silver, about 5% iron
 about 18% carbon, about 2 silver, about 80% iron
 about 5% carbon, about 15% silver, about 80% iron
 about 5% carbon, about 55% silver, about 40% iron
 about 40% carbon, about 55% silver, about 5% iron
and by the limits defined by interpolated points at pigment volume concentrations intermediate about 22% and about 53%, and curing said binder to an adherent continuous film containing said particles uniformly distributed therein.

5. A method for forming an electrically conductive coating on a non-conducting surface which comprises applying to said surface a composition comprising a thermosettable binder and a solvent for said binder having uniformly distributed therein finely divided particles of carbon, and granules of silver and iron, said granules having a maximum dimension of about 100 microns, said binder and said granules being present in proportions within the limits defined by the following reference points in volume percent of total pigment:

at a pigment volume concentration of about 22%—
 about 93% carbon, about 5% silver, about 2% iron
 about 93% carbon, about 2% silver, about 5% iron
 about 63% carbon, about 2% silver, about 35% iron
 about 20% carbon, about 45% silver, about 35% iron
 about 20% carbon, about 65% silver, about 15% iron
 about 30% carbon, about 65% silver, about 5% iron
at a pigment volume concentration of about 38%—
 about 93% carbon, about 5% silver, about 2% iron
 about 93% carbon, about 2% silver, about 5% iron
 about 40% carbon, about 2% silver, about 58% iron
 about 5% carbon, about 20% silver, about 75% iron
 about 5% carbon, about 55% silver, about 40% iron
 about 40% carbon, about 55% silver, about 5% iron
at a pigment volume concentration of about 53%—
 about 93% carbon, about 5% silver, about 2% iron
 about 93% carbon, about 2% silver, about 5% iron
 about 18% carbon, about 2% silver, about 80% iron
 about 5% carbon, about 15% silver, about 80% iron about 5% carbon, about 55% silver, about 40% iron About 40% carbon, about 55% silver, about 5% iron and by the limits defined by interpolated points at pigment volume concentrations intermediate about 22% and about 53%, and curing said binder to an adherent continuous film containing said particles uniformly distributed therein.

6. A method for forming an electrically conductive coating on a non-conducting surface which comprises applying to said surface a composition comprising a thermosettable binder and a solvent for said binder having uniformly distributed therein finely divided particles of carbon, and granules of silver and iron, said granules having a maximum dimension of about 100 microns, said binder and said granules being present in proportions within the limits defined by the following reference points in volume percent of total pigment:

at a pigment volume concentration of about 22%—
about 93% carbon, about 5% silver, about 2% iron
about 93% carbon, about 2% silver, about 5% iron
about 63% carbon, about 2% silver, about 35% iron
about 20% carbon, about 45% silver, about 35% iron
about 20% carbon, about 65% silver, about 15% iron
about 30% carbon, about 65% silver, about 5% iron at a pigment volume concentration of about 38%—
about 93% carbon, about 5% silver, about 2% iron
about 93% carbon, about 2% silver, about 5% iron
about 40% carbon, about 2% silver, about 58% iron
about 5% carbon, about 20% silver, about 75% iron
about 5% carbon, about 55% silver, about 40% iron
about 40% carbon, about 55% silver, about 5% iron at a pigment volume concentration of about 53%—
about 93% carbon, about 5% silver, about 2% iron
about 93% carbon, about 2% silver, about 5% iron
about 18% carbon, about 2% silver, about 80% iron
about 5% carbon, about 15% silver, about 80% iron
about 5% carbon, about 55% silver, about 40% iron
about 40% carbon, about 55% silver, about 5% iron and by the limits defined by interpolated points at pigment volume concentrations intermediate about 22% and about 53% and curing said binder to form an adherent film on said surface and thereafter raising the temperature of said film to a temperature of between about 300° F. and 550° F. for about one-half to about three hours and thereafter cooling said coating.

7. A heating element comprising a base material having on at least one surface thereof a thin electrically conductive, heat producing film, said film comprising a cured binder containing substantially uniformly distributed therein carbon, silver and iron in finely divided particle form, said binder and said granules being present in proportions within the limits defined by the following reference points in volume percent of total pigment.

at a pigment volume concentration of about 22%—
about 93% carbon, about 5% silver, about 2% iron
about 93% carbon, about 2% silver, about 5% iron
about 63% carbon, about 2% silver, about 35% iron
about 20% carbon, about 45% silver, about 35% iron
about 20% carbon, about 65% silver, about 15% iron
about 30% carbon, about 65% silver, about 5% iron at a pigment volume concentration of about 38%—
about 93% carbon, about 5% silver, about 2% iron
about 93% carbon, about 2% silver, about 5% iron
about 40% carbon, about 2% silver, about 58% iron
about 5% carbon, about 20% silver, about 75% iron
about 5% carbon, about 55% silver, about 40% iron
about 40% carbon, about 55% silver, about 5% iron at a pigment volume concentration of about 53%—
about 93% carbon, about 5% silver, about 2% iron
about 93% carbon, about 2% silver, about 5% iron
about 18% carbon, about 2% silver, about 80% iron
about 5% carbon, about 15% silver, about 80% iron
about 5% carbon, about 55% silver, about 40% iron
about 40% carbon, about 55% silver, about 5% iron and by the limits defined by interpolated points at pigment volume concentrations intermediate about 22% and about 53%.

8. A heating element comprising a base material having on at least one surface thereof a thin electrically conductive, heat producing coating, said coating comprising a thermoset binder having substantially uniformly distributed therein particles of carbon, silver and iron, said granules having a maximum dimension of about 100 microns, said binder and said granules being present in proportions within the limits defined by the following reference points in volume percent of total pigment:

at a pigment volume concentration of about 22%—
about 93% carbon, about 5% silver, about 2% iron
about 83% carbon, about 2% silver, about 5% iron
about 63% carbon, about 2% silver, about 35% iron
about 20% carbon, about 45% silver, about 35% iron
about 20% carbon, about 65% silver, about 15% iron
about 30% carbon, about 65% silver, about 5% iron at a pigment volume concentration of about 38%—
about 93% carbon, about 5% silver, about 2% iron
about 93% carbon, about 2% silver, about 5% iron
about 40% carbon, about 2% silver, about 58% iron
about 5% carbon, about 20% silver, about 75% iron
about 5% carbon, about 55 % silver, about 40% iron
about 40% carbon, about 55% silver, about 5% iron at a pigment volume concentration of about 53%—
about 93% carbon, about 5% silver, about 2% iron
about 93% carbon, about 2% silver, about 5% iron
about 18% carbon, about 2% silver, about 80% iron
about 5% carbon, about 15% silver, about 80% iron
about 5% carbon, about 55% silver, about 40% iron
about 40% carbon, about 55% silver, about 5% iron and by the limits defined by interpolated points at pigment volume concentrations intermediate about 22% and about 53%.

9. A heating element as defined in claim 8 wherein said thermosettable binder is at least 25% by weight of a silicone resin.

References Cited in the file of this patent

UNITED STATES PATENTS

| | | |
|---|---|---|
| 2,679,568 | Smith et al. | May 25, 1954 |
| 2,683,673 | Silversher | July 13, 1954 |
| 2,721,154 | Hopf et al. | Oct. 18, 1955 |
| 2,730,597 | Podolsky et al. | Jan. 10, 1956 |
| 2,851,380 | Berlinghof | Sept. 9, 1958 |
| 2,923,934 | Halpern | Feb. 2, 1960 |

UNITED STATES PATENT OFFICE
CERTIFICATE OF CORRECTION

July 30, 1963

Patent No. 3,099,578

Frank M. Hunter

It is hereby certified that error appears in the above numbered patent requiring correction and that the said Letters Patent should read as corrected below.

Column 13, line 74, for "40" read -- 40% --; column 14, line 25, for "ctrbon" read -- carbon --; column 16, line 28, for "83%" read -- 93% --.

Signed and sealed this 25th day of February 1964.

(SEAL)
Attest:

ERNEST W. SWIDER

Attesting Officer

EDWIN L. REYNOLDS

Acting Commissioner of Patents